(12) United States Patent
Xin et al.

(10) Patent No.: US 10,931,501 B2
(45) Date of Patent: Feb. 23, 2021

(54) DATA PROCESSING METHOD AND APPARATUS

(71) Applicant: ZTE CORPORATION, Guangdong (CN)

(72) Inventors: Yu Xin, Guangdong (CN); Guanghui Yu, Guangdong (CN); Jun Xu, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 16/752,486

(22) Filed: Jan. 24, 2020

(65) Prior Publication Data

US 2020/0162304 A1    May 21, 2020

Related U.S. Application Data

(63) Continuation of application No. 16/073,764, filed as application No. PCT/CN2017/071425 on Jan. 17, 2017, now Pat. No. 10,581,661.

(30) Foreign Application Priority Data

Jan. 29, 2016    (CN) .......................... 201610066883.5

(51) Int. Cl.
  *H04L 27/26*    (2006.01)
  *H04J 11/00*    (2006.01)
  *H04B 1/04*    (2006.01)

(52) U.S. Cl.
  CPC ....... *H04L 27/2691* (2013.01); *H04B 1/0475* (2013.01); *H04J 11/0023* (2013.01);
  (Continued)

(58) Field of Classification Search
  CPC ............. H04L 27/2691; H04L 27/2602; H04L 27/265; H04L 27/264; H04L 27/2628; H04B 1/0475; H04J 11/0023
  (Continued)

(56) References Cited

U.S. PATENT DOCUMENTS

2006/0072486 A1    4/2006  Park
2010/0165829 A1    7/2010  Narasimha et al.
(Continued)

FOREIGN PATENT DOCUMENTS

| CN | 102783059 A | 11/2012 |
|----|-------------|---------|
| CN | 103441734 A | 12/2013 |
| CN | 104639281 A | 5/2015  |

OTHER PUBLICATIONS

International Search Report in International Patent Application No. PCT/CN2017/071425 dated Apr. 14, 2017, 5 pages.
(Continued)

*Primary Examiner* — Fitwi Y Hailegiorgis
(74) *Attorney, Agent, or Firm* — Knobbe, Martens, Olson & Bear LLP

(57) ABSTRACT

Provided is a data processing method and apparatus. The method includes: performing an inverse fast Fourier transform (IFFT) on frequency-domain data of L consecutive symbols to obtain time-domain data of the L consecutive symbols, wherein the frequency-domain data of the L consecutive symbols have a subcarrier spacing of $f_{sc}$, and $L \geq 2$; and modulating the time-domain data of the L consecutive symbols with a preset function, where the modulated time-domain data of the L consecutive symbols have a symbol interval of $1/f_1$, and $f_1 < f_{sc}$; where a length of a value interval of an independent variable of the preset function is $N/f_1$, and N is a real number greater than or equal to 1.

12 Claims, 2 Drawing Sheets

---

Perform IFFT on frequency-domain data of L consecutive symbols to obtain time-domain data of the L consecutive symbols, where the frequency-domain data of the L consecutive symbols have a subcarrier spacing of $f_{sc}$, and $L \geq 2$    — 301

Modulate the time-domain data of the L consecutive symbols with a preset function, where the modulated time-domain data of the L consecutive symbols have a symbol interval of $1/f_1$, and $f_1 < f_{sc}$    — 302

(52) U.S. Cl.
CPC ........ *H04L 27/2602* (2013.01); *H04L 27/264* (2013.01); *H04L 27/265* (2013.01); *H04L 27/2628* (2013.01)

(58) Field of Classification Search
USPC .................................................. 375/260, 261
See application file for complete search history.

(56) References Cited

U.S. PATENT DOCUMENTS

| | | |
|---|---|---|
| 2012/0300824 A1 | 11/2012 | Maehata et al. |
| 2016/0182270 A1 | 6/2016 | Jungnickel et al. |
| 2017/0078054 A1* | 3/2017 | Hadani .................. H04L 5/003 |
| 2017/0126348 A1* | 5/2017 | Pourahmadi ............ H04J 13/00 |

OTHER PUBLICATIONS

Written Opinion in International Patent Application No. PCT/CN2017/071425 dated Apr. 14, 2017, 3 pages.

* cited by examiner

DATA PROCESSING METHOD AND APPARATUS

CROSS REFERENCE TO RELATED APPLICATIONS

This is a continuation of U.S. application Ser. No. 16/073,764 filed on Jul. 27, 2018, which was a National Stage Application filed under 35 U.S.C. 371, of International Patent Application No. PCT/CN2017/071425, filed on Jan. 17, 2017, which claims priority to Chinese patent application No. 201610066883.5 filed on Jan. 29, 2016, contents of both of which are incorporated herein by reference in their entireties.

TECHNICAL FIELD

The present disclosure relates to, but is not limited to, communication technologies, and more particularly, to a data processing method and apparatus.

BACKGROUND

Long Term Evolution (LTE) belongs to the fourth generation (4G) of wireless cellular communication technologies. As a multicarrier system, an LTE system adopts the orthogonal frequency division multiplexing (OFDM) technology, in which physical resources of the LTE system are composed of subcarriers in a frequency domain and symbols (about 71 us) in a time domain. Each symbol may include a plurality of subcarriers, and a plurality of symbols constitute one subframe. The adoption of a cyclic prefix (CP) enables a CP-OFDM system to eliminate multipath delay and to divide a frequency selective channel into a set of parallel flat channels, which successfully simplifies a channel estimation method and achieves a high accuracy in the channel estimation. However, the performance of the CP-OFDM system are more sensitive to frequency offset and time offset of adjacent sub-bands, which is mainly because spectrum leakage of this system is large, and thus it is prone to cause sub-band interference. At present, the LTE system uses a guard interval in the frequency domain, which reduces a spectrum efficiency. Therefore, new technologies are needed to inhibit out-of-band leakage.

In the industry, a study on the fifth generation (5G) of wireless communication technologies has been started, and inhibition of out-of-band leakage is an important direction of study on the 5G technologies. In new-type multicarrier schemes mentioned in some related articles, filter bank multicarrier (FBMC) and generalized frequency division multiplexing (GFDM) technologies can inhibit out-of-band leakage. However, these technologies are not satisfactory in compatibility with CP-OFDM technology of the LTE, channel estimation, combination with multiple input multiple output (MIMO) technology and so on. In some other documents, Filtered OFDM (F-OFDM) technology and universal filtered multicarrier (UFMC) technology are mentioned. Although these technologies are compatible with the CP-OFDM technology of the LTE, the out-of-band leakage is not inhibited well, and subcarriers in the bandwidth need to be synchronized strictly. That is, these technologies are still sensitive to frequency offset and time offset in sub-bands, with the demodulation performance of a receiving end decreased.

At present, in the premise of ensuring to be compatible with the LTE system as much as possible, it is unable to effectively inhibit out-of-band leakage and the demodulation performance of the receiving end is decreased.

SUMMARY

The following is an overview to the subject described in detail herein. This overview is not intended to limit the scope of protection of the claims.

Embodiments of the present disclosure provide a data processing method and apparatus, which can effectively inhibit out-of-band leakage and have better demodulation performance at a receiving end in the premise of ensuring to be compatible with an LTE system as much as possible.

In a first aspect, an embodiment of the present disclosure provides a data processing method, which is applied to a multicarrier system and includes:

performing an inverse fast Fourier transform (IFFT) on data and processing the data with a preset function.

The preset function is the product of a first function and a second function; the first function is a function in a time domain obtained by performing a Fourier transform on a root raised cosine function in a frequency domain; and the second function is in the time domain.

In an embodiment, processing the data with the preset function includes: filter bank (FB) processing.

In an embodiment, the FB processing includes: windowing the data subjected to the IFFT with the preset function.

In an embodiment, the second function is a raised cosine function in the time domain.

In an embodiment, a spectrum width of the first function is a reciprocal of a symbol interval of the multicarrier system.

In an embodiment, a spectrum width and a roll-off factor of the first function satisfy a relation $f_{sc} \geq f_1(1+\alpha)$; where $f_{sc}$ represents a subcarrier spacing of the multicarrier system, $f_1$ represents the spectrum width of the first function, and $\alpha$ represents the roll-off factor of the first function and has a value range of [0, 1].

In an embodiment, the data include multiple data sequences of L consecutive symbols, where $L \geq 2$.

Correspondingly, processing the data with the preset function includes: processing the data sequences of the L consecutive symbols with the preset function.

In an embodiment, processing the data sequences of the L consecutive symbols with the preset function includes:
processing a data sequence of each symbol of the L consecutive symbols with the preset function and superposing L data sequences processed.

In an embodiment, processing the data sequence of each symbol of the L consecutive symbols with the preset function and superposing the L data sequences processed include:
repeating and extending in the time domain based on the data sequence of each symbol subjected to the in the time domain to obtain a data sequence with a length of N×T corresponding to each symbol;
performing point multiplication operation between multiple discrete function values of the preset function and the data sequence with the length of N×T corresponding to the each symbol to obtain the L data sequences processed with a length of N×T; and
staggering successively by T in the time domain and superposing the L data sequences processed with the length of N×T to obtain a data sequence.

The length of a value interval of an independent variable of the preset function is N×T, where N is a real number greater than or equal to 1, and the T represents a symbol interval of the multicarrier system.

In an embodiment, the preset function includes: W(t)= IFsry(t)*x(t), where IFsry(t) represents the first function, and x(t) represents the second function.

$$IFsry(t) = IFFT(sry(f)), sry(f) = \sqrt{y(f)},$$

$$y(f) = \begin{cases} A & 0 \le |f| < f_0(1-\alpha) \\ \frac{A}{2}\left(1+\cos\left(\frac{|f|-f_0(1-\alpha)}{2f_0\alpha}\pi\right)\right) & f_0(1-\alpha) \le |f| < f_0(1+\alpha) \\ 0 & |f| \ge f_0(1+\alpha) \end{cases};$$

where f represents a frequency, the IFFT(.) represents IFFT on a function from a frequency domain into a time domain; the |.| is an absolute-value operator; A is a preset value, $\alpha$ is a roll-off factor and has a value range of [0, 1]; $f_0=f_1/2$, where $f_1$ represents a spectrum width of the first function, and $$f_1 = \frac{1}{T},$$

where T represents a symbol interval of the multicarrier system.

$$x(t) = \begin{cases} B & 0 \le |t| < T_0(1-\beta) \\ \frac{B}{2}\left(1+\cos\left(\frac{|t|-T_0(1-\beta)}{2T_0\beta}\pi\right)\right) & T_0(1-\beta) \le |t| < T_0(1+\beta) \\ 0 & |f| \ge f_0(1+\beta) \end{cases};$$

where t represents time, B is a preset value, $\beta$ is a roll-off factor and has a value range of [0, 1]; $T_0=T_1/2$, where $T_1$ is a parameter representing a width of the second function in the time domain, $T_1(1+\beta)=N\times T$, where N is a real number greater than or equal to 1.

In an embodiment, $f_{sc}$ represents a subcarrier spacing of the multicarrier system, where $f_{sc} \ge 2f_0(1+\alpha)$.

In an embodiment, the L consecutive symbols are L consecutive symbols on one subframe or one resource block in the multicarrier system.

In a second aspect, an embodiment of the present disclosure provides another data processing method, which is applied to a multicarrier system and includes:
processing data with a preset function and performing a fast Fourier transform (FFT) on the data.

The preset function is the product of a first function and a second function; the first function is a function in a time domain obtained by performing a Fourier transform on a root raised cosine function in a frequency domain; and the second function is in the time domain.

In an embodiment, processing the data with the preset function includes: processing with a filter bank (FB).

In an embodiment, the second function is a raised cosine function in the time domain.

In an embodiment, a spectrum width of the first function is a reciprocal of a symbol interval of the multicarrier system.

In an embodiment, a spectrum width and a roll-off factor of the first function satisfy a relation $f_{sc} \ge f_1(1+\alpha)$; where $f_{sc}$ represents a subcarrier spacing of the multicarrier system, $f_1$ represents the spectrum width of the first function, and $\alpha$ is the roll-off factor of the first function and has a value range of [0, 1].

In an embodiment, the preset function includes: W(t)= IFsry(t)*x(t), where IFsry(t) represents the first function, and x(t) represents the second function. The length of a value interval of an independent variable of the preset function is N×T, where N is a real number greater than or equal to 1, and T represents a symbol interval of the subcarrier system.

$$IFsry(t) = IFFT(sry(f)), sry(f) = \sqrt{y(f)},$$

$$y(f) = \begin{cases} A & 0 \le |f| < f_0(1-\alpha) \\ \frac{A}{2}\left(1+\cos\left(\frac{|f|-f_0(1-\alpha)}{2f_0\alpha}\pi\right)\right) & f_0(1-\alpha) \le |f| < f_0(1+\alpha) \\ 0 & |f| \ge f_0(1+\alpha) \end{cases};$$

where f represents a frequency, the IFFT(.) represents IFFT on a function from a frequency domain into a time domain; the |.| is an absolute-value operator; A is a preset value, $\alpha$ is a roll-off factor and has a value range of [0, 1]; $f_0=f_1/2$, where $f_1$ represents a spectrum width of the first function, and $$f_1 = \frac{1}{T},$$

where T represents a symbol interval of the subcarrier system.

$$x(t) = \begin{cases} B & 0 \le |t| < T_0(1-\beta) \\ \frac{B}{2}\left(1+\cos\left(\frac{|t|-T_0(1-\beta)}{2f_0\beta}\pi\right)\right) & T_0(1-\beta) \le |t| < f_0(1+\beta) \\ 0 & |t| \ge T_0(1+\beta) \end{cases};$$

wherein t represents time, B is a preset value, $\beta$ is a roll-off factor and has a value range of [0, 1]; $T_0=T_1/2$, where $T_1$ is a parameter representing a width of the second function in the time domain, $T_1(1+\beta)=N\times T$.

In an embodiment, $f_{sc}$ represents a subcarrier spacing of the multicarrier system, where $f_{sc} \ge 2f_0(1+\alpha)$.

In a third aspect, an embodiment of the present disclosure provides a data processing apparatus, which is applied to a transmitting node of a multicarrier system and includes:
a first processing unit, configured to perform an inverse fast Fourier transform (IFFT) on data and process the data with a preset function.

The preset function is the product of a first function and a second function; the first function is a function in a time domain obtained by performing a Fourier transform on a root raised cosine function in a frequency domain; and the second function is in the time domain.

In a fourth aspect, the present disclosure provides another data processing apparatus, which is applied to a receiving node of a multicarrier system and includes:
a second processing unit, configured to process data with a preset function and perform a fast Fourier transform (FFT) on the data;

The preset function is the product of a first function and a second function; the first function is a function in a time domain obtained by performing a Fourier transform on a root raised cosine function in a frequency domain; and the second function is in the time domain.

In a fifth aspect, an embodiment of the present disclosure provides a computer readable storage medium, on which computer-executable instructions are stored. The computer-executable instructions, when executed, implement the data processing method according to the first aspect or any embodiment in the first aspect.

In a sixth aspect, an embodiment of the present disclosure further provides a computer readable storage medium, on which computer-executable instructions are stored. The computer-executable instructions, when executed, implement the data processing method according to the second aspect or any embodiment in the second aspect.

In the data processing method and apparatus provided by the embodiments of the present disclosure, a transmitting side performs IFFT and then performs filter bank (FB) processing, which is well compatible with the LTE system. Data of adjacent symbols may be superposed and interfered after being modulated with a preset function. However, function characteristics of the preset function in the embodiments of the present disclosure enable to minimize the interference. A receiving side demodulates the data with the preset function again to provide a better demodulation performance. Furthermore, the characteristics of the preset function also may better inhibit out-of-band leakage.

Other aspects may be apparent after reading and understanding the accompany drawings and detailed description.

DETAILED DESCRIPTION OF THE EMBODIMENTS

The following will make a detailed description of the embodiments of the present invention with reference to the accompanying drawings. It is to be noted that the embodiments of this application and the features in the embodiments may be arbitrarily combined with each other in the case of no conflict.

Steps illustrated in flowcharts of the accompanying drawings may be performed in, for example, a computer system storing a group of computer-executable instructions. Moreover, though logical sequences are shown in the flowcharts, in some cases, the shown or described steps may be performed in sequences different from the shown sequences herein.

Figure 1:
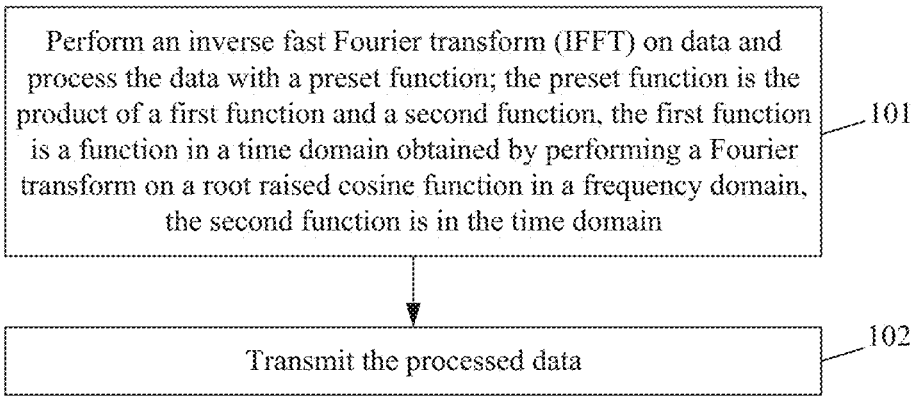
FIG. 1 is a schematic flowchart of a data processing method according to an embodiment of the present disclosure.

An embodiment of the present disclosure provides a data processing method based on a transmitting side of a multicarrier system. As shown in FIG. 1, the method includes steps described below.

In Step 101, an inverse fast Fourier transform (IFFT) is performed on data and the data are processed with a preset function.

The preset function is the product of a first function and a second function. The first function is a function in a time domain obtained by performing a Fourier transform on a root raised cosine function in a frequency domain. The second function is in the time domain.

The spectrum width of the first function is a reciprocal of a symbol interval of the multicarrier system.

The spectrum width and a roll-off factor of the first function satisfy a relation $f_{sc} \geq f_1(1+\alpha)$; where $f_{sc}$ represents a subcarrier spacing of the multicarrier system, $f_1$ represents the spectrum width of the first function, and α represents the roll-off factor of the first function and has a value range of [0, 1].

The second function is a raised cosine function in the time domain.

The processing with the preset function generally refers to refers to filter bank (FB) processing, which may be also referred to as polyphase filtering. The polyphase filtering includes a plurality of parallel filtering. Therefore, in the embodiments of the present disclosure, the polyphase filtering is also referred to as filter bank (FB) processing. Moreover, because this embodiment is based on a transmitting side, the FB processing may be also referred to as polyphase filtering modulation (processing of data by the transmitting side generally is referred to as modulation).

Moreover, the FB processing includes windowing the data subjected to the IFFT with the preset function. That is, the FB processing is equivalent to windowing in the time domain.

One or more parameters of the FB processing are determined by the preset function.

Other processing procedures may be introduced between the IFFT and the FB processing, which is not limited by the present disclosure.

In Step 102, the processed data are transmitted.

Exemplarily, in Step 102, after data are subjected to modulation, the transmitter side processes the data with a digital-to-analog converter (DAC), performs a radio frequency operation (belonging to existing technological means) on the data, and transmits the data via an antenna.

The data include data sequences of L consecutive symbols, where L≥2.

Correspondingly, the data with the preset function is processed as follows: the data sequences of the L consecutive symbols are processed with the preset function.

The data sequences of the L consecutive symbols are processed with the preset function as follows:

the data sequence of each symbol of the L symbols is processed with the preset function, and L data sequences processed are superposed.

The data sequence of each symbol of the L symbols is processed with the preset function, and the L data sequences processed are superposed as follows:

repeating and extending are performed in the time domain based on the data sequence of each symbol subjected to the IFFT in the time domain to obtain a data sequence with a length of N×T corresponding to each symbol;

point multiplication operation is performed between discrete function values of the preset function and the data sequence with the length of N×T corresponding to each symbol to obtain the L data sequences processed with a length of N×T; and the L data sequences processed with the length of N×T are successively staggered by T in the time domain and then superposed.

The length of the value interval of an independent variable of the preset function is N×T, where N is a real number greater than or equal to 1, and T represents a symbol interval of the multicarrier system.

The above data sequence is a discrete data sequence in the time domain.

The preset function may be a continuous function or a discrete function.

When the preset function is a continuous function, the discrete function values of the preset function refer to function values corresponding to the values of the independent variable at moments the same as those of the data of respective symbols in the time domain.

For example, the data sequence of each symbol is repeated and extended to a data sequence with a length of N×T. Provided that the time interval of adjacent discrete data is Ts and the number of discrete data included within the time T is K, then K×Ts=T, and N×K×Ts=N×T. Therefore, the data sequence with the length of N×T includes N×K discrete data (here the N×K is assumed to be an integer). Provided that a first discrete datum is as the moment 0, a second discrete datum is at the moment Ts, a third discrete datum is at the moment 2Ts, and a (N×K)th (that is, the last one) discrete datum is at the moment (N×K−1)Ts. The length of the interval of the independent variable of the aforementioned waveform function also is N×T. Therefore, the discrete function values of the preset function refer to the function values corresponding to the values of the independent variable being 0, Ts, . . . (N×K−1)Ts. That is, the continuous function may be sampled at the interval Ts of the independent variable to obtain the discrete function values of the preset function.

When the preset function is a discrete function, the number of values of independent variable of the discrete function within an interval of the independent variable with a length of N×T is equal to that of data included in the data sequence with a length of N×T. A continuous function may be sampled to obtain the discrete function.

As can be seen from above, the processing at the transmitting side with the preset function (or the FB processing) results in waveform function windowing on the data. Therefore, for the transmitting side, the processing with the preset function (or the FB processing) is sometimes also referred to as windowing.

The preset function may include: W(t)=IFsry(t)*x(t), wherein IFsry(t) represents the first function, and x(t) represents the second function.

$$IFsry(t) = IFFT(sry(f)), sry(f) = \sqrt{y(f)},$$

$$y(f) = \begin{cases} A & 0 \leq |f| < f_0(1-\alpha) \\ \frac{A}{2}\left(1 + \cos\left(\frac{|f| - f_0(1-\alpha)}{2f_0\alpha}\pi\right)\right) & f_0(1-\alpha) \leq |f| < f_0(1+\alpha); \\ 0 & |f| \geq f_0(1+\alpha) \end{cases}$$

where f represents a frequency, IFFT(.) represents IFFT on a function from a frequency domain into a time domain; the |.| is an absolute-value operator; A is a preset value, α is a roll-off factor and has a value range of [0, 1]; $f_0=f_1/2$, where $f_1$ represents a spectrum width of the first function, and $$f_1 = \frac{1}{T},$$

where T represents a symbol interval of the multicarrier system;

$$x(t) = \begin{cases} B & 0 \leq |t| < T_0(1-\beta) \\ \frac{B}{2}\left(1 + \cos\left(\frac{|t| - T_0(1-\beta)}{2f_0\beta}\pi\right)\right) & T_0(1-\beta) \leq |t| < f_0(1+\beta); \\ 0 & |t| \geq T_0(1+\beta) \end{cases}$$

where t represents time, B is a preset value, β is a roll-off factor and has a value range of [0, 1]; $T_0=T_1/2$, where $T_1$ represents a parameter representing the width of the second function in the time domain, $T_1(1+\beta)=N\times T$, where N is a real number greater than or equal to 1. That is, a maximum time span of the independent variable corresponding to non-zero function values of the second function is equal to N×T. $f_{sc}$ represents a subcarrier spacing of the multicarrier system, where $f_{sc} \geq 2f_0(1+\alpha)$. For example, $f_{sc}=2f_0(1+\alpha)$.

For y(f), when the roll-off factor α=1, the y(f) is:

$$y(f) = \begin{cases} \frac{A}{2}\left(1 + \cos\left(\frac{|f|}{2f_0}\pi\right)\right) & 0 \leq |f| < 2f_0 \\ 0 & |f| \geq 2f_0 \end{cases};$$

or
when the roll-off factor α=0, the y(f) is:

$$y(f) = \begin{cases} A & 0 \leq |f| < f_0 \\ 0 & |f| \geq f_0 \end{cases}.$$

Similarly, when the roll-off factor β is equal to 1 or 0, the function x(t) may be transformed into other forms.

It is to be particularly noted that shifting or transformation of the first function and the second function in other forms fall within the scope of protection of the present disclosure.

The maximum time span of the independent variable corresponding to non-zero function values of the preset function is greater than or equal to T. The L consecutive symbols are L consecutive symbols on one subframe or one resource block in the multicarrier system.

In the embodiments of the present disclosure, the transmitting side performs IFFT and then performs filter bank (FB) processing, which is well compatible with the LTE system. Data of adjacent symbols may be superposed and interfered after being modulated with a preset function. However, function characteristics of the preset function in the embodiments of the present disclosure enable to minimize the interference. A receiving side may have a better demodulation performance. Furthermore, the characteristics of the preset function in the embodiments of the present disclosure also may better inhibit out-of-band leakage.

In this embodiment of the present disclosure, the transmitting side uses the preset function to modulate the data, such that a main lobe of the subcarrier in the frequency domain has a narrower width. As a result, main lobes of adjacent subcarriers are not overlapped, no larger interference is caused, and thus the adjacent subcarriers may be asynchronous. That is, the minimum unit for scheduling of user resources may be a subcarrier, and synchronization is not required for users.

Figure 2:
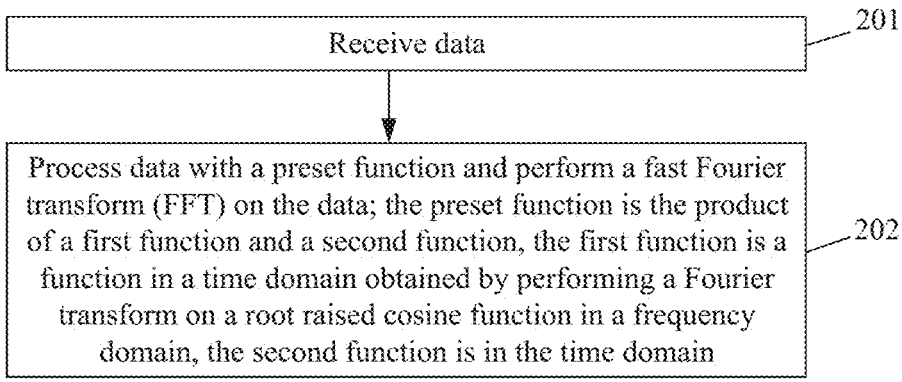
FIG. 2 is a schematic flowchart of another data processing method according to an embodiment of the present disclosure.
Figure 3:
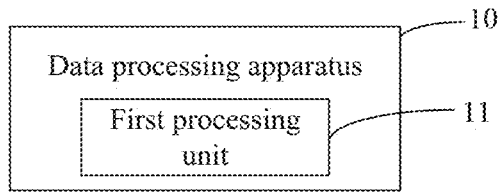
FIG. 3 is a schematic structural diagram of a data processing apparatus according to an embodiment of the present disclosure.
Figure 4:
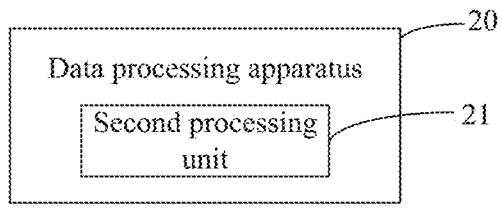
FIG. 4 is a schematic structural diagram of another data processing apparatus according to an embodiment of the present disclosure.
Figure 5:
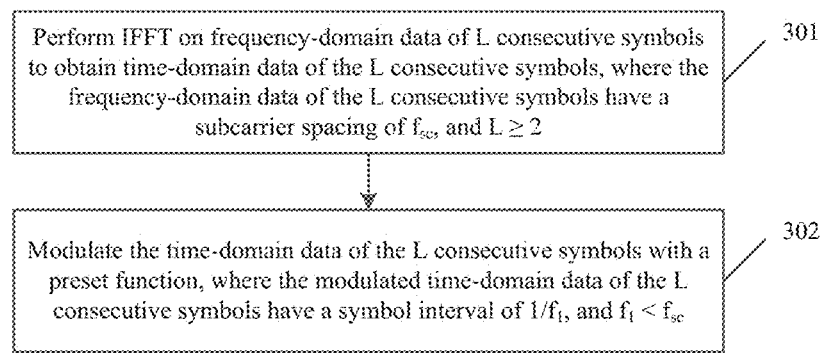
FIG. 5 is a schematic flowchart of another data processing method according to an embodiment of the present disclosure.
Figure 6:
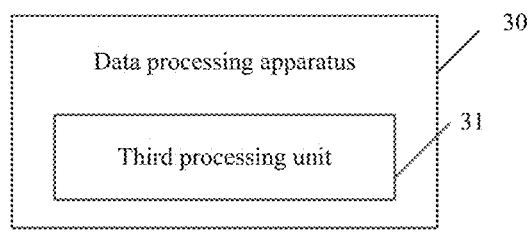
FIG. 6 is a schematic structural diagram of another data processing apparatus according to an embodiment of the present disclosure.

An embodiment of the present disclosure provides a data processing method based on a receiving side of a multicarrier system. As shown in FIG. 2, the method includes steps described below.

In Step 201, data are received.

Exemplarily, the receiving side may receive the data subjected to modulation processing and transmitted by the transmitting side in the above method embodiments.

In Step 202, data are processed with a preset function and a fast Fourier transform (FFT) is performed on the data.

The preset function is the product of a first function and a second function. The first function is a function in a time domain obtained by performing a Fourier transform on a root raised cosine function in a frequency domain. The second function is in the time domain.

The spectrum width of the first function is a reciprocal of a symbol interval of the subcarrier system.

The spectrum width and a roll-off factor of the first function satisfy a relation $f_{sc} \geq f_1(1+\alpha)$; where $f_{sc}$ represents a subcarrier spacing of the multicarrier system, $f_1$ represents the spectrum width of the first function, and $\alpha$ is the roll-off factor of the first function and has a value range of [0, 1].

The second function is a raised cosine function in the time domain.

The processing of the data with the preset function includes filter bank (FB) processing.

The processing with the preset function generally refers to filter bank (FB) processing, which may be also referred to as polyphase filtering. The polyphase filtering includes a plurality of parallel filtering. Therefore, in the embodiments of the present disclosure, the polyphase filtering processing is also referred to as filter bank (FB) processing. Moreover, because this embodiment is based on the receiving side, the FB processing may be also referred to as polyphase filtering demodulation (processing of data by the receiving side generally is referred to as demodulation).

One or more parameters of the FB processing are determined by the preset function.

Other processing procedures may be introduced between the FB processing and the FFT, which is not limited by the present disclosure.

After the receiving side performs demodulates the received data in Step 202, the original data prior to modulation by the transmitting side may be recovered by follow-up channel equalization and detection (existing technical means).

The preset function includes: W(t)=IFsry(t)*x(t), where IFsry(t) represents the first function, and x(t) represents the second function. The length of the value interval of an independent variable of the preset function is N×T, where N is a real number greater than or equal to 1, and the T represents a symbol interval of the multicarrier system.

$$IFsry(t) = IFFT(sry(f)), sry(f) = \sqrt{y(f)},$$

$$y(f) = \begin{cases} A & 0 \leq |f| < f_0(1-\alpha) \\ \frac{A}{2}\left(1+\cos\left(\frac{|f|-f_0(1-\alpha)}{2f_0\alpha}\pi\right)\right) & f_0(1-\alpha) \leq |f| < f_0(1+\alpha); \\ 0 & |f| \geq f_0(1+\alpha) \end{cases}$$

where f represents a frequency, IFFT(.) represents IFFT on a function from a frequency domain into a time domain; the |.| is an absolute-value operator; A is a preset value, $\alpha$ is a roll-off factor and has a value range of [0, 1]; $f_0=f_1/2$, where $f_1$ represents a spectrum width of the first function, and $$f_1 = \frac{1}{T},$$

where T represents a symbol interval of the multicarrier system;

$$x(t) = \begin{cases} B & 0 \leq |t| < T_0(1-\beta) \\ \frac{B}{2}\left(1+\cos\left(\frac{|t|-T_0(1-\beta)}{2T_0\beta}\pi\right)\right) & T_0(1-\beta) \leq |t| < f_0(1+\beta); \\ 0 & |t| \geq T_0(1+\beta) \end{cases}$$

where t represents time, B is a preset value, $\beta$ is a roll-off factor and has a value range of [0, 1]; $T_0=T_1/2$, where $T_1$ is a parameter representing a width of the second function in the time domain, $T_1(1+\beta)=N\times T$.

$f_{sc}$ represents a subcarrier spacing of the multicarrier system, where $f_{sc} \geq 2f_0(1+\alpha)$. For example, $f_{sc}=2f_0(1+\alpha)$.

An embodiment of the present disclosure further provides a data processing method based on a receiving side. After receiving the data modulated and transmitted by the transmitting side, the data are demodulated with a preset function the same as that of the transmitting side, and then FFT and follow-up processing are performed on the demodulated data to obtain original data. Function characteristics of the preset function in the embodiments of the present disclosure enable to minimize the interference. The receiving side can have a better demodulation performance. Furthermore, the characteristics of the preset function in the embodiments of the present disclosure can also better inhibit out-of-band leakage.

An embodiment of the present disclosure provides a data processing apparatus 10, which is applied to a transmitting node of a multicarrier system. The apparatus 10 includes a first processing unit 11.

The first processing unit 11 is configured to perform an inverse fast Fourier transform (IFFT) on data and process the data with a preset function.

The preset function is the product of a first function and a second function. The first function is a function in a time domain obtained by performing a Fourier transform on a root raised cosine function in a frequency domain. The second function is in the time domain.

The processing of the data with the preset function includes: filter bank (FB) processing.

The FB processing refers to windowing the data subjected to the IFFT with the preset function.

The second function is a raised cosine function in the time domain.

The spectrum width of the first function is a reciprocal of a symbol interval of a multicarrier system.

The spectrum width and a roll-off factor of the first function satisfy a relation $f_{sc} \geq f_1(1+\alpha)$; where $f_{sc}$ represents a subcarrier spacing of the multicarrier system, $f_1$ represents the spectrum width of the first function, and a represents the roll-off factor of the first function and has a value range of [0, 1].

The transmitting end of the multicarrier system includes a base station, a terminal, a relay, a transmitting point and other various transmitting devices, which are collectively referred to as transmitting node herein.

This embodiment is used for implementing the embodiments of the first data processing method.

Reference is made to description of the above method embodiments for workflows and working principles of units in this embodiment, which are not repeated any more herein.

An embodiment of the present disclosure further provides a data processing apparatus 20, which is applied to a receiving node of a multicarrier system. The apparatus 20 includes a second processing unit 21.

The second processing unit 21 is configured to process data with a preset function and perform a fast Fourier transform (FFT) on the data.

The preset function is the product of a first function and a second function. The first function is a function in a time domain obtained by performing a Fourier transform on a root raised cosine function in a frequency domain. The second function is in the time domain.

The processing the data with a preset function includes: filter bank (FB) processing.

The second function is a raised cosine function in the time domain.

The spectrum width of the first function is a reciprocal of a symbol interval of a multicarrier system.

The spectrum width and a roll-off factor of the first function satisfy a relation $f_{sc} \geq f_1(1+\alpha)$; where $f_{sc}$ represents a subcarrier spacing of the multicarrier system, $f_1$ represents the spectrum width of the first function, and α represents the roll-off factor of the first function and has a value range of [0, 1].

The receiving end of the multicarrier system includes a base station, a terminal, a relay, and other various receiving devices, which are collectively referred to as receiving node herein.

This embodiment is used for implementing the embodiments of the second data processing method.

Reference is made to description of the embodiments of the second method for data processing for workflows and working principles of units in this embodiment, which are not repeated any more herein.

An embodiment of the present disclosure further provides a storage medium. In this embodiment, the storage medium may be configured to store program codes for performing steps in the embodiments of any data processing method described above.

The storage medium is further configured to store program codes for performing steps in the embodiments of any data processing method described above.

In this embodiment, the above storage medium may include but is not limited to: a USB flash disk, a read-only memory (ROM), a random access memory (RAM), a mobile hard disk, a magnetic disk or an optical disk and other media that may store program codes.

In this embodiment, a processor is configured to execute, based on the program codes stored in the storage medium, the program codes for performing steps in the embodiments of any one of the above methods for data processing.

The present disclosure further provides a data processing method. The method includes steps described blow.

In step 301, an IFFT is performed on frequency-domain data of L consecutive symbols to obtain time-domain data of the L consecutive symbols, where the frequency-domain data of the L consecutive symbols have a subcarrier spacing of $f_{sc}$, and L≥2.

In step 302, the time-domain data of the L consecutive symbols is modulated with a preset function, where the modulated time-domain data of the L consecutive symbols have a symbol interval of $1/f_1$, and $f_1 < f_{sc}$.

The length of a value interval of an independent variable of the preset function is $N/f_1$, and N is a real number greater than or equal to 1.

The present disclosure further provides a data processing apparatus 30. The apparatus 30 includes third processing unit 31. The third processing unit 31 is configured to implement the data processing method described above.

Reference may be made to examples as recited in the above embodiments and implementations of any one of the above methods for data processing for examples in this embodiment, which are not repeated any more herein.

The above are implementations disclosed by the present disclosure. However, the described contents are merely implementations adopted for better understanding the present disclosure rather than limiting the present disclosure. Any person skilled in the art can make any modification and variation to the implementing forms or details without departing from the spirit and scope of the present disclosure. However, the patent protection scope of the present disclosure should still be subjected to the scope defined in the appended claims.

INDUSTRIAL APPLICABILITY

In the data processing method and the apparatus provided by the embodiments of the present disclosure, a transmitting side performs IFFT on data and processes the data with a preset function, which is compatible with the LTE system. Function characteristics of the preset function in the embodiments of the present disclosure enable to minimize the interference. A receiving side demodulates data with the preset function again to provide a better demodulation performance. Furthermore, the characteristics of the preset function also enable to better inhibit out-of-band leakage.

What is claimed is:

1. A data processing method, comprising:
performing an inverse fast Fourier transform (IFFT) on frequency-domain data of L consecutive symbols to obtain time-domain data of the L consecutive symbols, wherein the frequency-domain data of the L consecutive symbols have a subcarrier spacing of $f_{sc}$, and L≥2; and
modulating the time-domain data of the L consecutive symbols with a preset function, wherein the modulated time-domain data of the L consecutive symbols have a symbol interval of $1/f_1$, and $f_1 < f_{sc}$;
wherein a length of a value interval of an independent variable of the preset function is $N/f_1$, and N is a real number greater than or equal to 1.

2. The method according to claim 1, wherein modulating the time-domain data of the L consecutive symbols with the preset function comprises: filter bank (FB) processing.

3. The method according to claim 2, wherein the FB processing comprises:
windowing, with the preset function, the time-domain data of the L consecutive symbols.

4. The method according to claim 2, wherein a spectrum width of the first function is a reciprocal of a symbol interval of a multicarrier system.

5. The method according to claim 1, wherein the preset function is a product of a first function and a second function; the first function is a function in a time domain obtained by performing an inverse Fourier transform on a root raised cosine function in a frequency domain; and the second function is a raised cosine function in the time domain.

6. The method according to claim 5, wherein a spectrum width and a roll-off factor of the first function satisfy a relation $f_{sc} \geq f_1(1+\alpha)$; $f_{sc}$ represents a subcarrier spacing of a multicarrier system, $f_1$ represents the spectrum width of the first function, and $\alpha$ is the roll-off factor of the first function and has a value range of [0, 1].

7. The method according to claim 6, wherein the time-domain data of the L consecutive symbols comprises a plurality of data sequences,
wherein modulating the time-domain data of the L consecutive symbols with the preset function comprises:
modulating a data sequence of each symbol of the L consecutive symbols with the preset function and superposing L data sequences modulated.

8. The method according to claim 7, wherein modulating the data sequence of each symbol of the L consecutive symbols with the preset function and superposing the L data sequences processed comprise:
repeating and extending in the time domain based on the data sequence of the each symbol to obtain a data sequence with a length of N×T corresponding to the each symbol;
performing point multiplication operation between a plurality of discrete function values of the preset function and the data sequence with the length of N×T corresponding to the each symbol to obtain the L data sequences processed with a length of N×T; and
staggering successively by T in the time domain and superposing the L data sequences processed with the length of N×T to obtain a data sequence;
wherein a length of a value interval of an independent variable of the preset function is N×T, N is a real number greater than or equal to 1, and T represents a symbol interval of the multicarrier system.

9. The method according to claim 5, wherein the preset function comprises: W(t)=IFsry(t)*x(t), IFsry(t) represents the first function, and x(t) represents the second function; wherein IFsry(t)=IFFT(sry(f)), sry(f)=$\sqrt{y(f)}$, $$y(f) = \begin{cases} A & 0 \leq |f| < f_0(1-\alpha) \\ \frac{A}{2}\left(1+\cos\left(\frac{|f|-f_0(1-\alpha)}{2f_0\alpha}\pi\right)\right) & f_0(1-\alpha) \leq |f| < f_0(1+\alpha) ; \\ 0 & |f| \geq f_0(1+\alpha) \end{cases}$$

wherein f represents a frequency, IFFT(.) represents IFFT on a function from a frequency domain into a time domain; the |.| is an absolute-value operator; A is a preset value, $\alpha$ is a roll-off factor and has a value range of [0, 1]; f0=f1/2, wherein f1 represents a spectrum width of the first function, and $$f_1 = \frac{1}{T},$$

wherein T represents a symbol interval of a multicarrier system;

$$x(t) = \begin{cases} B & 0 \leq |t| < T_0(1-\beta) \\ \frac{B}{2}\left(1+\cos\left(\frac{|t|-T_0(1-\beta)}{2T_0\beta}\pi\right)\right) & T_0(1-\beta) \leq |t| < f_0(1+\beta) ; \\ 0 & |t| \geq T_0(1+\beta) \end{cases}$$

wherein t represents time, B is a preset value, $\beta$ is a roll-off factor and has a value range of [0, 1]; T0=T1/2, wherein T1 is a parameter representing a width of the second function in the time domain, $T_1(1+\beta)$=N×T.

10. The method according to claim 9, wherein $f_{sc} \geq 2f_0(1+\alpha)$.

11. The method according to claim 7, wherein the L consecutive symbols are L consecutive symbols on one subframe or one resource block in a multicarrier system.

12. A data processing apparatus, comprising:
a processor; and
a memory for storing instructions executable by the processor,
wherein the instructions, when executed by the processor, cause the processor to perform a method comprising:
performing an inverse fast Fourier transform (IFFT) on frequency-domain data of L consecutive symbols to obtain time-domain data of the L consecutive symbols, wherein the frequency-domain data of the L consecutive symbols have a subcarrier spacing of $f_{sc}$, and L≥2; and
modulating the time-domain data of the L consecutive symbols with a preset function, wherein the modulated time-domain data of the L consecutive symbols have a symbol interval of $1/f_1$, and $f_1 < f_{sc}$;
wherein a length of a value interval of an independent variable of the preset function is $N/f_1$, and N is a real number greater than or equal to 1.

* * * * *